(12) United States Patent
Lauper et al.

(10) Patent No.: US 6,803,887 B1
(45) Date of Patent: Oct. 12, 2004

(54) METHOD AND CORRESPONDING DEVICES FOR DELIVERING USEFUL DATA CONCERNING OBSERVED OBJECTS

(75) Inventors: Eric Lauper, Bern (CH); Corinne Pittet, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/031,493

(22) PCT Filed: Jul. 22, 1999

(86) PCT No.: PCT/CH99/00339

§ 371 (c)(1),
(2), (4) Date: Jan. 22, 2002

(87) PCT Pub. No.: WO01/08414

PCT Pub. Date: Feb. 1, 2001

(51) Int. Cl.[7] .................................................. G09G 5/00
(52) U.S. Cl. .................. 345/9; 345/7; 345/8; 351/209; 359/13
(58) Field of Search .......................... 345/7–9, 156–158; 351/209; 359/13, 629–631

(56) References Cited

U.S. PATENT DOCUMENTS

| 5,653,751 | A | * | 8/1997 | Samiy et al. | |
|---|---|---|---|---|---|
| 5,898,423 | A | * | 4/1999 | Tognazzini et al. | 345/158 |
| 6,127,990 | A | * | 10/2000 | Zwern | 345/8 |
| 6,181,302 | B1 | * | 1/2001 | Lynde | 345/7 |
| 6,239,915 | B1 | * | 5/2001 | Takagi et al. | 359/629 |
| 6,243,076 | B1 | * | 6/2001 | Hatfield | 345/156 |
| 6,317,103 | B1 | * | 11/2001 | Furness et al. | 345/8 |
| 6,411,266 | B1 | * | 6/2002 | Maguire, Jr. | 345/8 |
| 6,597,346 | B1 | * | 7/2003 | Havey et al. | 345/169 |
| 6,614,408 | B1 | * | 9/2003 | Mann | 345/8 |

FOREIGN PATENT DOCUMENTS

WO     94 09472     * 4/1994

* cited by examiner

*Primary Examiner*—Kent Chang
*Assistant Examiner*—Tom Sheng
(74) *Attorney, Agent, or Firm*—Oblon, Spivak, McClelland, Maier & Neustadt, P.C.

(57) ABSTRACT

A method, a mobile device and a central unit for supplying a mobile user with service information relating to real world objects viewed by him, picture data for at least one of the objects being captured and made visible to the user by a picture producing device worn or carried by the user in that picture signals corresponding to the picture data are projected directly on the retina of the user, the user selecting a picture segment from the made-visible picture data which is determined through eye positions of the user, picture segment data based on the picture segment being sent to a processing unit which is located in the mobile device or in the central unit and which determines the desired service information based on the picture segment data, for example a translation of the text information provided on the viewed objects or background information on the viewed objects, and this service information being reproduced for the user, for example in visible or audible form.

14 Claims, 1 Drawing Sheet

METHOD AND CORRESPONDING DEVICES FOR DELIVERING USEFUL DATA CONCERNING OBSERVED OBJECTS

BACKGROUND OF THE INVENTION

(1) Field of the Invention

This invention concerns a method and suitable devices for supplying service information relating to viewed objects. In particular, this invention concerns a method and suitable devices for supplying a mobile user with service information relating to objects viewed by him.

(2) Description of Related Art

Known methods from the field of picture processing make it possible to recognize and identify objects from digital picture data that have been captured by means of suitable picture capturing means, for example by means of a digital photo or video camera or obtained through digitalization from an analog picture, which objects are contained in the pictures corresponding to the picture data. For example, letters and text consisting thereof can be recognized by means of OCR (Optical Character Recognition). Such known methods and devices suitable therefor are used predominantly as part of fixed-installed facilities and systems or can be used in a mobile way as part of mobile devices by users with manual operation, for instance in a hand scanner for text acquisition. It is often desirable, however, for mobile users to obtain information directly concerning objects viewed by them without having to carry out separate taking of pictures which are used for information acquisition only.

It is an object of this invention to propose a new and better method as well as devices suitable therefor which make it possible to supply a user during viewing of objects with service information relating to the objects viewed by him.

This object is achieved according to the present invention in particular through the elements of the independent claims. Further advantageous embodiments follow moreover from the dependent claims and from the description.

BRIEF SUMMARY OF THE INVENTION

This object is achieved by the present invention in particular in that picture data for an object viewed by the mobile user are captured by means of picture capturing means borne by the user, at least certain of these picture data are made visible to the user by picture signals corresponding to these picture data being projected directly on the retina of the user, it being possible to process the picture data before they are made visible by emphasizing contours or increasing contrasts, for instance, and the user selects a picture segment from the picture data made visible, the picture segment being determined through eye positions of the user, picture segment data based on the selected picture segment are transmitted to a processing unit, which processing unit determines said service information based on said picture segment data, and said service information are reproduced for the user.

In an embodiment variant, the processing unit is located in a central unit and the picture segment data are transmitted to the processing unit in the central unit via a mobile radio network, for example a GSM or UMTS network or another, e.g. satellite-based, mobile radio network. This embodiment variant is above all advantageous if the processing of the picture segment data to obtain the service information is very complex and cannot be carried out efficiently locally at the user, e.g. because the mobile device necessary therefor would be too big and heavy and/or because the service information contains data that are not available locally at the user. The other way around, a processing unit situated locally in a mobile device at the user, has the advantage that no communications components have to be present in this device, that there is no dependence upon the external central unit, and no delay is caused by the communication with the external central unit.

It should be mentioned here that, in addition to the method according to the invention, the present invention also relates to a suitable central device and to a suitable mobile device.

In an embodiment variant, through a text recognition module in the mobile device, text information in a first language is derived from the selected picture segment and is forwarded as picture segment data to the processing unit (in the mobile device or in the central device), which processing unit translates this text information into service information with text information in a second language. In an alternative embodiment variant, the picture segment data are transmitted unchanged to the central unit with the picture data corresponding to the selected picture segment, and text information in a first language is derived therefrom by the processing unit, and this text information is translated into service information with text information in a second language. These embodiments have the advantage that the mobile user, who is located in a foreign country, for example, is able to have objects viewed by him with foreign-language text information provided therefor translated into his mother tongue without having thereby to consult manually paper-based or electronic translation aids.

In an embodiment variant, the processing unit (in the mobile device or in the central device) identifies at least one viewed object based on the picture segment data, and, based on this object identification, prepares service information including object information associated with this object. The advantage of this embodiment consists in that the mobile user, who is located in a museum, for example, or in a city with sights, is able to be supplied with identification and/or background information for objects viewed by him, for instance items on exhibit or historical structures, without his having to consult manually paper-based or electronic sources or having to keep prescribed routes.

In variants, which can be selected by the user, for instance, the service information is reproduced for the user in visible or audible form. The reproduction in audible form has in particular the advantage that user information can also be made available to a sight-impaired user, for example, which extends the application possibilities and the possibilities for use of the method according to the invention and of the mobile device according to the invention in a manifold way since it can be used as a seeing aid with acoustical information reproduction.

BRIEF DESCRIPTION OF THE DRAWINGS

An embodiment of the present invention will be described in the following with reference to an example. The example of the embodiment is illustrated by a single attached FIGURE.

DETAILED DESCRIPTION OF THE INVENTION

Figure 1:
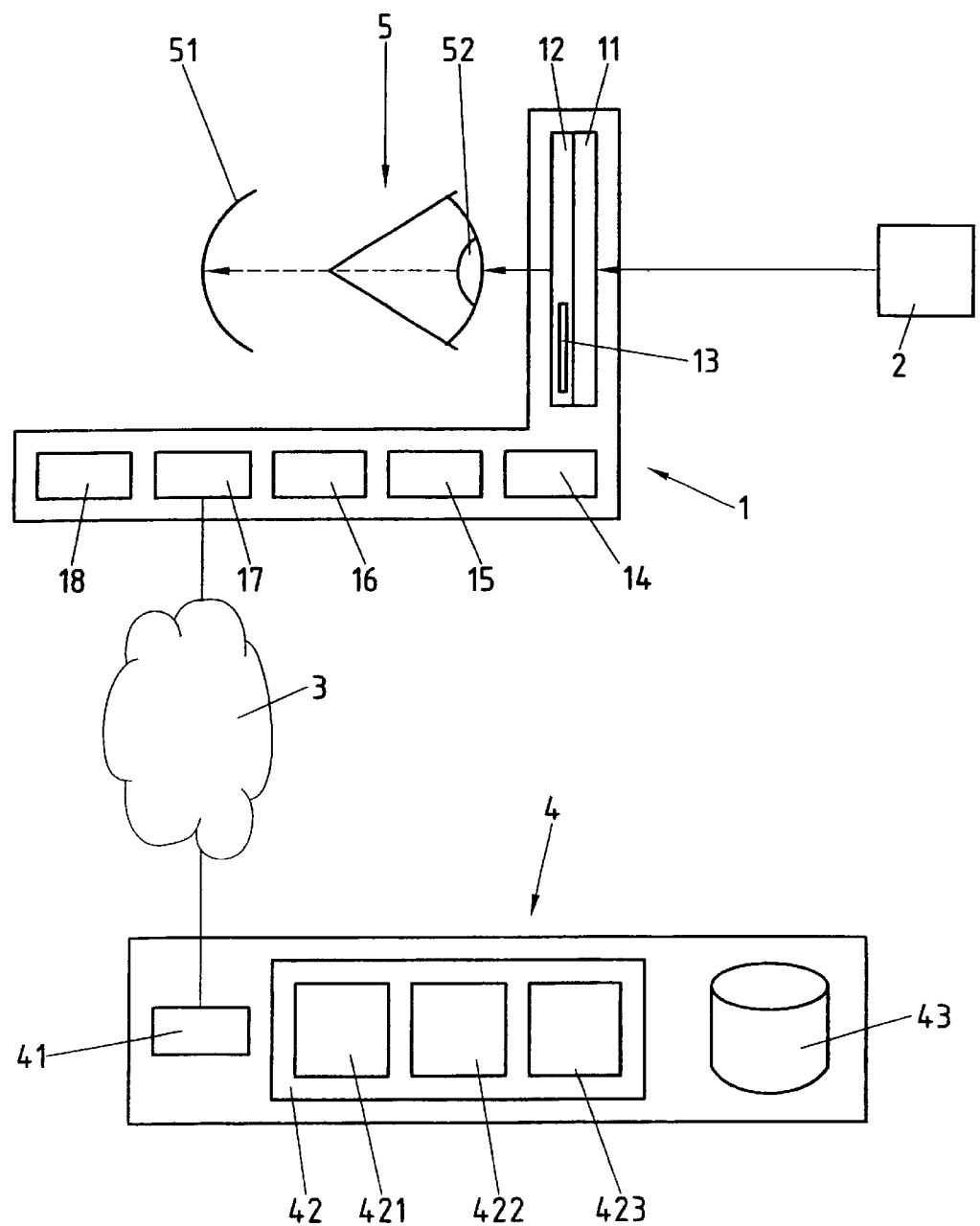
FIG. 1 shows a block diagram in which a central unit is schematically represented connected to a mobile device via a mobile radio network, which mobile device includes a virtual retinal display device that projects picture signals directly onto the retina of an eye.

The reference numeral 1 in FIG. 1 refers to a mobile device which includes a virtual retinal display device 12 that makes pictures visible to the user of the mobile device 1 by projecting corresponding picture signals directly onto the retina 51 of the eye 5 of the user. The pictures are still or moving pictures of objects 2 which are being viewed by the user. The picture data for the pictures are taken by suitable picture capturing means, for example by a video camera 11 or by suitable optical elements 11 using the virtual retinal display device 12 as capturing picture scanner, and picture signals corresponding to the picture data are projected onto the retina 51 by the virtual retinal display device 12. The use of micro-electromechanical elements, in particular micro-electromechanical scanners with a biaxial mirror, for projection of the picture signals in a direct retinal display device and/or for capturing light reflected or emitted by objects is described, for example, in the patent application WO 98/13720. It should be mentioned here that it is definitely possible to modify the captured picture data by suitable picture processing means before they are made visible to the user; for instance contours can be emphasized or other picture processing carried out.

At least certain first components of the mobile device 1, in particular the virtual retinal display device 12 and preferably also the picture capturing means 11, are integrated into a common housing or installed on a common support, this housing or this support being preferably designed such that it can be put on by a user like conventional eyeglasses. Second components, which are possibly integrated into a further, separate housing, are connected via a wired or via a wireless interface to first components located in the specially designed housing or on the specially designed support.

A virtual retinal display device (Virtual Retinal Display, VRD) that can project picture signals directly onto the retina 51 of a viewer has been described, for instance, in the patent applications WO 94/09472, WO 97/37339 and in the above-mentioned patent application WO 98/13720. These virtual retinal display devices can be supplied with picture data via a video interface, for example in the form of an RGB signal, an NTSC signal, a VGA signal or another formatted colored or monochrome video or graphic signal. One skilled in the art will understand that it can be advantageous to adapt the virtual retinal display device described in the mentioned patent publications WO 94/09472 and WO 97/37339, or respectively the video interface described there, such that it is also able to receive efficiently other formats of picture data, depending upon the picture capturing means 11 used. By means of an interface module (not shown), captured picture data can also be adapted suitably to the video interface, however, or received picture data converted such that they can be applied to the video interface and can be made visible for the viewer by means of the virtual retinal display device 12.

As shown schematically in FIG. 1, the virtual retinal display device 12 includes an eye position determining module 13, which is able to determine current eye positions of the user during viewing of pictures and transmit them via an additional wired or wireless interface to a selection module 14 of the mobile device 1. An eye position determining module (eye tracker) which determines current eye positions based on the position of the pupil 52 of a user has also been described in the above-mentioned patent application WO 94/09472 and can be extended by one skilled in the art such that the determined eye position is available for components outside the virtual retinal display device 12 via a suitable interface; depending upon the embodiment, values for both eyes can be made available.

The selection module 14 of the mobile device 1, for example a programmed software module executed on a processor of the mobile device 1, determines on the basis of current eye positions which part of the projected overall picture is being viewed by the viewer and derives therefrom a picture segment of the projected overall picture. The selection of a picture segment based on the eye positions of the user can be controlled in various ways. For example, a picture segment of predefined or variable size can be selected when the selection module 14 notes that the user has viewed the same sub-area of the overall picture for a predetermined length of time. In another variant, a picture segment of predefined or variable size can be selected after the user has given a corresponding signal to the selection module 14 by means of an operating element (not shown), for instance a key provided for that purpose. The selection step can also be initiated by the user, in a further variant, by his positioning his eye(s) on a predefined area, which is represented, for instance, as a graphic operating element, like in a conventional graphic user interface, and is preferably located in an outer picture region, and by his viewing the desired picture area to be selected, for instance after display of a graphically represented response message from the selection module 14.

Such a selection module 14 consequently makes it possible to use the virtual retinal display device 12 as a graphic user interface that can be controlled by the user through positioning his eyes in that, by means of the virtual retinal display device 12, the selection module 14 projects GUI (Graphical User Interface) objects in picture regions onto the retina 51 of the user corresponding to predefined eye position values and is able to receive commands entered by the user by means of eye positioning through comparison of the current eye positions with the predefined eye positions. The selection module can also use known GUI methods, for instance, to facilitate the selection of a desired picture segment. For instance, prior to the actual selection of a picture segment, the picture segment which has been received by the selection module as the picture segment to be selected can be indicated by a rectangular auxiliary line, and, by means of conventional operating elements or by means of the mentioned graphic operating elements, can be activated by the user as the selected picture segment. In this way, the size of the picture segment to be selected can also be chosen, and the processing function to be applied to the selected picture segment, if applicable.

The possibilities for further processing a selected picture segment are endless, and in the following paragraphs only two application possibilities will be described more closely, namely the translation of text information provided on the viewed object and the recognition and identification of objects 2. It should be stated here that the mobile device 1, or respectively the method described, can be achieved in such a way that only one predefined further processing function is available in each case or in such a way that different further processing function <sic. functions> selectable by the user can be available.

In the first application example, the mobile device 1 functions for the user as translation spectacles, i.e. if the selected picture segment contains text information in a first language, the user can be provided with service information with text data in a translated second language. For this purpose, a selected picture segment, for instance in the form of a bit map or in suitable compressed form, is supplied to a text recognition module 15, 421, for example a hardware-wise or software-wise OCR (Optical Character Recognition) process, which recognizes letters or respectively written symbols contained in the selected picture segment and creates therefrom composite text information, for instance in the form of a character string, and forwards it for translation in corresponding picture segment data to a corresponding processing unit 16, or respectively a translation module 422 (of the processing unit 42), whereby the processing unit 16, or respectively the translation module 422, is designed as a programmed software module with access to translation tables (not shown). Depending upon embodiment variant, both the text recognition module 15 as well as the processing unit 16 are part of the mobile device 1, or just the text recognition module 15 is part of the mobile device 1 while the processing unit 42 with the translation module 422 is located in a central unit 4, or both the text recognition module 421 and the processing unit 42 with the translation module 422 are located in the central unit 4. For embodiment variants in which picture segment data are forwarded to corresponding modules in the central unit 4 for further processing, the mobile device 1 includes a communications module 17 that has the necessary hardware and software components to communicate with the central unit 4 via a mobile radio network 3. The mobile radio network 3 is, for instance, a GSM pr UMTS network or another, e.g. satellite-based, mobile radio network via which the mobile device 1 is able to exchange data with the central unit 4, for instance with the aid of SMS messages (Short Message Services), USSD messages (Unstructured Supplementary Services Data), GPRS services (Generalized Packet Radio Service), or according to a suitable protocol over the user information channel.

The central unit 4 is based, for example, on a commercially available communications server having the necessary hardware and software components to communicate over the mobile radio network 3 with the mobile device 1 via a communications module 41. The central unit 4 is connected to the mobile radio network 3 directly or via suitable network elements, for example a Mobile Switching Station (MSC), and includes, for example, a database 43 which is implemented on the same computer or on a separate computer and contains the above-mentioned translation tables and/or tables with object identification data and associated object information.

The object information is needed in the second application example in which a selected picture segment, for instance in the form of a bit map or in suitable compressed form, <is> supplied as picture segment data to the processing unit 16, or <is> respectively forwarded over the mobile radio network 3 to the object identification module 423 (in the processing unit 42) of the central unit 4. For example, by means of suitable programmed software functions, pictures of objects 2 contained in the received picture segment data are worked out therefrom in the processing unit 16, or respectively in the object identification module 423, and the most central or the largest object in relation to the picture segment is identified with the aid of the mentioned object identification data that are stored in the database 43 or in the local tables of the mobile device 1. Then, on the basis of the received object identification, associated object information is taken from the database 43, or respectively from the corresponding local tables in the mobile device 1, and is supplied as service information. The application possibilities for such "object information spectacles" are almost unlimited. Object information may be, for instance, background information relating to items on exhibit in a museum or historical structures and sights in a city, the advantage of the "object information spectacles" being that the mobile user does not have to stick to a prescribed route and does not need to consult manually conventional, paper-based or electronic information sources.

The service information supplied by the processing unit 16, 42, for instance translated text information or object information, are forwarded to a reproduction module 18 in the mobile device 1, this taking place over the mobile radio network 3 and the communications module 17 from the processing unit 42 in the central unit 4 by means of the communications module 41. The reproduction module 18 has the necessary hardware and software components to make the received service information, for instance selectable by the user, visible to the user via the virtual retinal display device 12, or, for instance with the aid of a speech synthesis module, to make them audible via acoustical converters (not shown), e.g. headphones or loudspeakers. The reproduction in audible form has in particular the advantage that service information can also be made available to a seeing-impaired user, for instance, which extends in a manifold way the possibilities for use and application of the method according to the invention and of the mobile device 1 according to the invention since they can be used as seeing aids with acoustical service information reproduction.

In an embodiment variant, the mobile device 1 is made up of the above-mentioned specially designed housing or specially designed support in which, or respectively on which, at least the virtual retinal display device 12 (with the eye position determining module 13) and the picture capturing means 11 are located, and of an extended conventional mobile communications terminal, for example a mobile radio telephone or a communication-capable laptop or palmtop computer, which communications terminal is connected via a mentioned interface to components in the specially designed housing or respectively on the specially designed support. The mobile communications terminal thereby assumes the role of the communications module 17, whereby the selection module 14 as well as further modules, if applicable, e.g. the text recognition module 15, the processing unit 16 and software components of the reproduction module 18, are stored as programmed software modules in a memory of the communications terminal, and are executed on a processor of the communications terminal, for instance a memory and a processor on a chipcard of the communications terminal. This chipcard, for example an SIM card (Subscriber Identification Module), can also contain, if applicable, the mentioned translation tables and object information as well as user-specific data such as, for instance, the desired translation target language.

In another embodiment variant co-operating with the central unit, the components in the mentioned specially designed housing or respectively on the specially designed support also include the selection module 14, the communications module 17, the reproduction module 18 as well as a processor and memory for execution of the software modules, in addition to the virtual retinal display device 12 (with the eye position determining module 13) and the picture capturing means 11.

A mobile device 1 operating purely locally comprises in the mentioned specially designed housing or respectively on the specially designed support, in addition to the virtual retinal display device 12 (with the eye position determining module 13) and the picture capturing means 11, the selection module 14, the text recognition module 15, the processing unit 16, the reproduction module 18 as well as a processor and memory for execution of the software modules or respectively for storing of translation tables and/or object information.

It should be mentioned here moreover that it is certainly also possible to integrate the picture capturing means 11, in particular a video camera, into the mobile device 1 such that it can be directed by the user, for instance manually, in any desired direction so that in particular objects 2 that do not lie in the normal direction of sight of the user can also be viewed, e.g. objects situated behind his back or which can be viewed only through a tiny opening in a sight impediment.

The mobile device 1 can be extended moreover with position determining means, for example satellite-based position determining means, e.g. based on the Global Positioning System (GPS) or terrestrial position determining means (Terrestrial Positioning System, TPS), so that the context for determining described service information can be influenced (limited) by the current geographic position of the user, or respectively of the mobile device 1.

Complete described mobile devices 1 can be sold or leased to an interested user. It can also be of commercial interest to sell extension sets comprising the necessary components to extend a conventional communications terminal into a described mobile device 1, which extension sets also contain stored thereon in particular a data carrier with programmed selection module 14, programmed software components of the reproduction module 18 and, if applicable, a programmed text recognition module 15 and a programmed processing unit 16. Described central units 4 can be offered under license to interested operators, or data carriers can be sold containing a programmed communications module 41 and a processing unit 42, for example with a programmed text recognition module 421, a programmed translation module 422 and a programmed object identification module 423 as well as a database 43 for operating a conventional communications server, having the hardware components required by the communications module 41, as described central unit 4. An operator of a central unit 4 can charge the user a monetary amount for each translation and for each object information query, for instance, the user being identified for this purpose through a user identification, for example an IMSI (International Mobile Subscriber Identity) or an IDUI (International Debit User Identifier) that is co-provided to the central unit 4 with each query, for instance.

LIST OF REFERENCE NUMERALS 1 mobile device
2 object
3 mobile radio network
4 central unit
5 eye
11 picture capturing means
12 virtual retinal display device
13 eye position determining module
14 selection module
15 text recognition module
16 processing unit
17 communications module
18 reproduction module
41 communications module
42 processing unit
43 database
51 retina
52 pupil
421 text recognition module
422 translation module
423 object identification module

What is claimed is:

1. A method for supplying a mobile user with service information relating to real world objects viewed by the user, wherein picture data for at least one of said real world objects are captured by means of a picture capturing means borne by the user, at least a portion of said picture data is made visible to the user by picture signals being projected directly on a retina of the user, the user selects a picture segment from the picture data made visible, the picture segment being determined through eye positions of the user, picture segment data based on the picture segment are transmitted to a processing unit configured to determine said service information based on said picture segment data, and said service information is reproduced for the user.

2. The method according to claim 1, wherein said processing unit is located in a central unit and said picture segment data are transmitted over a mobile radio network to said processing unit.

3. The method according to one of the claims 1 or 2, wherein said picture segment data contain a text information in a first language derived from said picture segment and said processing unit translates the text information into said service information in a second language.

4. The method according to claim 2, wherein said picture segment data contain the picture data corresponding to said picture segment, and said processing unit derives a text information in a first language from said picture segment and translates the text information into said service information in a second language.

5. The method according to one of the claims 1 or 2, wherein said
   processing unit identifies at least one of said real world objects based on said picture segment data, and said processing unit prepares said service information based on the at least one of said real world objects identified by said processing unit, which service information contains information associated with said object.

6. The method according to one of the claims 1, 2, and 4, wherein at least a portion of said service information is reproduced for the user in visible form.

7. The method according to one of the claims 1, 2, and 4, wherein at least a portion of said service information is reproduced for the user in audible form.

8. A mobile device which supplies its user with service information relating to real world objects viewed by the user, the device comprising:

picture capturing means for capturing picture data for at least one of said real world objects, a virtual retinal display device to make at least a portion of said picture data visible to the user, wherein picture signals corresponding to said picture data are configured to be projected directly on a retina of the user, and said virtual retinal display device includes an eye position determining module that determines current eye positions of the user, a selection module that, based on said eye positions, determines a picture segment from the picture data made visible to the user, the selection module forwarding picture segment data based on the picture segment to a processing unit configured to determine said service information based on said picture segment data, and a reproduction module configured to reproduce said service information for the user.

9. The device according to claim 8, further comprising a text recognition module configured to derive picture segment data with a text information in a first language from said picture segment.

10. The device according to claim 9, wherein said processing unit is configured to translate said text information into said service information in a second language.

11. The device according to one of the claims 8 or 9, wherein the device includes a communications module configured to forward said picture segment data via a mobile radio network to said processing unit in a central unit and to receive via the mobile radio network service information derived by the said processing unit.

12. The device according to claim 8, wherein said processing unit is configured to identify said at least one of said real world objects based on said picture segment data, and prepare said service information based on the at least one object identification, which service information contains object information associated with said object.

13. The device according to one of the claims 8, 9, 10 or 12, wherein the reproduction module is set up to reproduce at least a portion of said service information for the user in visible form.

14. The device according to one of the claims 8, 9, 10 or 12, wherein the reproduction module is set up to reproduce at least a portion of said service information for the user in audible form.

* * * * *